(12) United States Patent
Wang et al.

(10) Patent No.: US 11,829,544 B1
(45) Date of Patent: Nov. 28, 2023

(54) ELECTRONIC DEVICE AND METHOD OF MANUFACTURING THE SAME

(71) Applicant: TPK Advanced Solutions Inc., Fujian (CN)

(72) Inventors: Chih Sheng Wang, Hsinchu (TW); Li Hung Chang, Taoyuan (TW); Jin Huo Liao, Xiamen (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/865,451

(22) Filed: Jul. 15, 2022

(51) Int. Cl.
*G06F 3/041* (2006.01)
*B32B 7/14* (2006.01)
*B32B 37/12* (2006.01)
*B32B 37/10* (2006.01)
*B32B 3/08* (2006.01)

(52) U.S. Cl.
CPC .............. *G06F 3/0412* (2013.01); *B32B 3/08* (2013.01); *B32B 7/14* (2013.01); *B32B 37/10* (2013.01); *B32B 37/1292* (2013.01); *B32B 2305/72* (2013.01); *B32B 2307/414* (2013.01); *B32B 2457/208* (2013.01); *G06F 2203/04103* (2013.01)

(58) Field of Classification Search
CPC ......... G06F 3/0412; G06F 2203/04103; B32B 3/08; B32B 7/14; B32B 37/10; B32B 37/1292; B32B 2305/72; B32B 2307/414; B32B 2457/208
See application file for complete search history.

(56) References Cited

U.S. PATENT DOCUMENTS

| 2017/0155052 A1* | 6/2017 | Zhang | H10K 71/00 |
| 2021/0168231 A1* | 6/2021 | Baker | H05K 5/0086 |

FOREIGN PATENT DOCUMENTS

| CN | 112596307 | * | 4/2021 |
| CN | 114596778 A | | 6/2022 |
| TW | 201712385 A | | 4/2017 |
| TW | I616690 B | | 3/2018 |

* cited by examiner

*Primary Examiner* — Grant Sitta
(74) *Attorney, Agent, or Firm* — Cooper Legal Group, LLC

(57) ABSTRACT

An electronic device includes a cover plate assembly, a frameless display panel assembly, and an adhesive layer. The cover plate assembly has a first major surface. A peripheral region of the first major surface has a first area. The frameless display panel assembly is disposed below the cover plate assembly and has a second major surface. A peripheral region of the second major surface has a second area smaller than the first area. The adhesive layer is disposed between the peripheral region of the first major surface and the peripheral region of the second major surface. The adhesive layer is a frame-shaped and elastic colloid. The adhesive layer, the cover plate assembly, and the frameless display panel assembly together form a closed space after being pressed together, and the closed space has a spacing smaller than 200 microns.

17 Claims, 4 Drawing Sheets

ELECTRONIC DEVICE AND METHOD OF MANUFACTURING THE SAME

BACKGROUND

Technical Field

The present disclosure relates to an electronic device and a method of manufacturing the same.

Description of Related Art

At present, a method of laminating a touch module and a display module of a touch display device is to use a full lamination technology. The disadvantage is that the thickness is too thick, the weight is too large, the cost is high, and the dismantling consumes a lot of manpower and material resources. In order to solve the aforementioned problems, an edge lamination technology has been developed, such as Taiwan Patent No. 1616690. However, when moving towards large-scale lamination, the aforementioned lamination technologies are all likely to cause deformation problems of the touch display device (i.e., the spacing between the touch module and the display module cannot be controlled) and the Mura problem derived from deformation.

Accordingly, how to provide an electronic device to solve the aforementioned problems becomes an important issue to be solved by those in the industry.

SUMMARY

An aspect of the disclosure is to provide an electronic device that can efficiently solve the aforementioned problems.

According to an embodiment of the disclosure, an electronic device includes a cover plate assembly, a frameless display panel assembly, and an adhesive layer. The cover plate assembly has a first major surface. A peripheral region of the first major surface has a first area. The frameless display panel assembly is disposed below the cover plate assembly and has a second major surface. A peripheral region of the second major surface has a second area smaller than the first area. The adhesive layer is disposed between the peripheral region of the first major surface and the peripheral region of the second major surface. The adhesive layer is a frame-shaped and elastic colloid. The adhesive layer, the cover plate assembly, and the frameless display panel assembly together form a closed space after being pressed together, and the closed space has a spacing smaller than 200 microns.

In an embodiment of the disclosure, the closed space is vacuumed.

In an embodiment of the disclosure, an air pressure value in the closed space is between 0.0003 MPa and 0.001 MPa.

In an embodiment of the disclosure, the cover plate assembly includes a cover plate body and a touch panel. The touch panel is stacked below the cover plate body and located between the cover plate body and the frameless display panel assembly.

In an embodiment of the disclosure, the touch panel includes a silver nanowire electrode layer. The touch panel formed by the silver nanowire electrode layer defines at least a part of the first major surface.

In an embodiment of the disclosure, the cover plate assembly further includes an anti-glare layer. The anti-glare layer is disposed on a side of the touch panel away from the cover plate body and forms at least a part of the first major surface.

In an embodiment of the disclosure, a haze of the anti-glare layer is at least greater than 15%.

In an embodiment of the disclosure, the electronic device further includes an optical film layer. The optical film layer is disposed on the second major surface.

In an embodiment of the disclosure, a haze of the optical film layer is at least greater than 15%.

According to an embodiment of the disclosure, a method of manufacturing an electronic device includes: applying an adhesive material on a peripheral region of a first major surface of a cover plate assembly, in which the peripheral region of the first major surface has a first area; pressing a frameless display panel assembly and the cover plate assembly so that a peripheral region of a second major surface of the frameless display panel assembly contacts the adhesive material, in which the peripheral region of the second major surface has a second area smaller than the first area; and curing the adhesive material into an adhesive layer, in which the adhesive layer is a frame-shaped and elastic colloid, the adhesive layer, the cover plate assembly, and the frameless display panel assembly together form a closed space, and the closed space has a spacing smaller than 200 microns.

In an embodiment of the disclosure, the pressing the frameless display panel assembly and the cover plate assembly and the curing the adhesive material into the adhesive layer are performed in a vacuum environment.

In an embodiment of the disclosure, an air pressure value in the closed space is between 0.0003 MPa and 0.001 MPa.

In an embodiment of the disclosure, the cover plate assembly includes a cover plate body and a touch panel stacked on each other. The touch panel includes a silver nanowire electrode layer. The touch panel formed by the silver nanowire electrode layer defines at least a part of the first major surface.

Accordingly, in the electronic device of the present disclosure, the cover plate assembly and the frameless display panel assembly are laminated together by using the elastic frame-shaped adhesive layer, and the spacing of the closed space formed by the adhesive layer, the cover plate assembly, and the frameless display panel assembly is limited to be smaller than 200 microns, such that the spacing can be effectively controlled.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
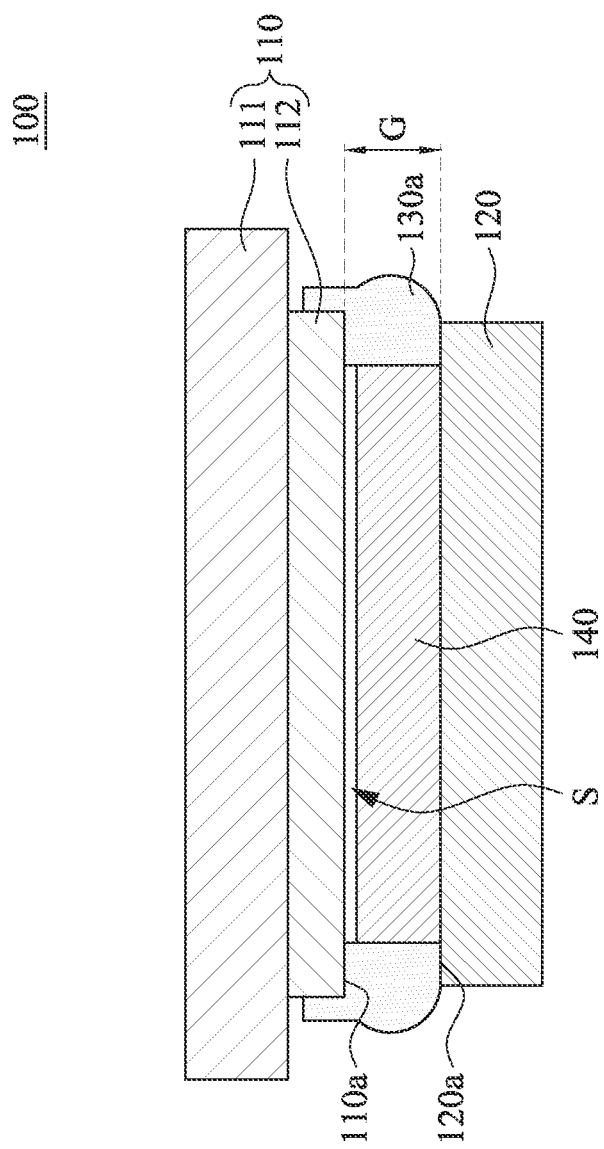
FIG. 1 is a schematic cross-sectional view of an electronic device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic cross-sectional view of an electronic device 100 according to an embodiment of the present disclosure. As shown in FIG. 1, in the present embodiment, the electronic device 100 includes a cover plate assembly 110, a frameless display panel assembly 120, and an adhesive layer 130a. The cover plate assembly 110 has a first major surface 110a. A peripheral region of the first major surface 110a has a first area. The frameless display panel assembly 120 is disposed below the cover plate assembly 110 and has a second major surface 120a. The adhesive layer 130a is disposed between the peripheral region of the first major surface 110a and a peripheral region of the second major surface 120a. The adhesive layer 130a is a frame-shaped and elastic colloid. The adhesive layer 130a, the cover plate assembly 110, and the frameless display panel assembly 120 together form a closed space S after being pressed together, and the closed space S has a spacing G smaller than 200 microns.

With the foregoing structural configurations, the spacing G of the closed space S formed by the adhesive layer 130a, the cover plate assembly 110, and the frameless display panel assembly 120 can be effectively controlled, and the deformation problem and the Mura problem caused by deformation in large-scale applications can be effectively suppressed.

In some embodiments, as shown in FIG. 1, the first major surface 110a of the cover plate assembly 110 is a bottom surface of the cover plate assembly 110, and the peripheral region of the first major surface 110a may be defined as the region where the adhesive layer 130a contacts the first major surface 110a, but the disclosure is not limited in this regard.

In some embodiments, as shown in FIG. 1, the second major surface 120a of the frameless display panel assembly 120 is a top surface of the frameless display panel assembly 120, and the peripheral region of the second major surface 120a may be defined as the region where the adhesive layer 130a contacts the second major surface 120a, but the disclosure is not limited in this regard.

In some embodiments, the peripheral region of the second major surface 120a has a second area smaller than the first area. In this way, there can be more areas for the adhesive layer 130a to adhere to, thereby providing better adhesion strength.

In some embodiments, the closed space S is vacuumed. In this way, after the adhesive layer 130a, the cover plate assembly 110, and the frameless display panel assembly 120 are pressed together, since the air pressure in the closed space S is less than 1 atmosphere pressure, the inside of the closed space S will be continuously pressed by the external environment, thereby maintaining continuous non-deformation and air tightness.

In some embodiments, the air pressure value in the closed space S is smaller than 0.001 MPa. Under this condition, the ability of the electronic device 100 to prevent moisture and dust from entering the closed space S can be significantly improved.

In some embodiments, the air pressure value in the closed space S is greater than 0.0003 MPa. Under this condition, the problem of deformation of the electronic device 100 caused by excessive pressure difference inside and outside the closed space S can be effectively prevented.

As shown in FIG. 1, in the present embodiment, the cover plate assembly 110 includes a cover plate body 111 and a touch panel 112. The touch panel 112 is stacked below the cover plate body 111 and located between the cover plate body 111 and the frameless display panel assembly 120. In addition, the electronic device 100 further includes an optical film layer 140. The optical film layer 140 is disposed on the second major surface 120a of the frameless display panel assembly 120. The adhesive layer 130a surrounds an edge of the optical film layer 140. In other words, the optical film layer 140 is located in the closed space S.

In some embodiments, the optical film layer 140 is a polarizer, but the disclosure is not limited in this regard.

In some embodiments, a haze of the optical film layer 140 is at least greater than 15%, so as to effectively avoid the problem of uneven brightness caused by the Mura phenomenon (if any) of the frameless display panel assembly 120.

In some embodiments, the touch panel 112 includes a silver nanowire electrode layer. The touch panel 112 formed by the silver nanowire electrode layer forms at least a part of the first major surface 110a. In this way, the vacuumed closed space S can effectively avoid the deterioration of the silver nanowire electrode layer.

Figure 2A:
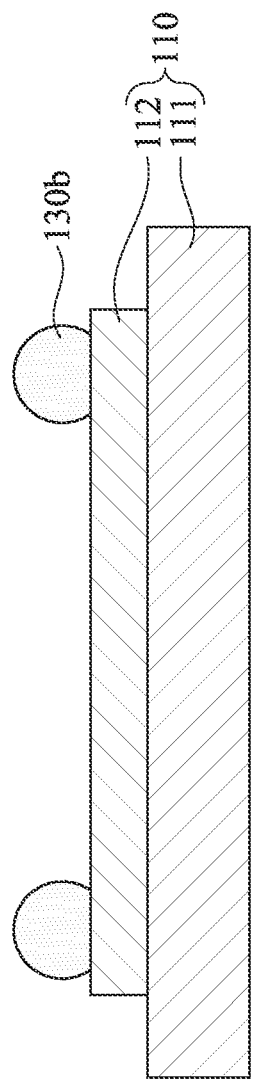
FIG. 2A is a schematic cross-sectional view illustrating an intermediate stage of manufacturing the electronic device according to an embodiment of the present disclosure.
Figure 2B:
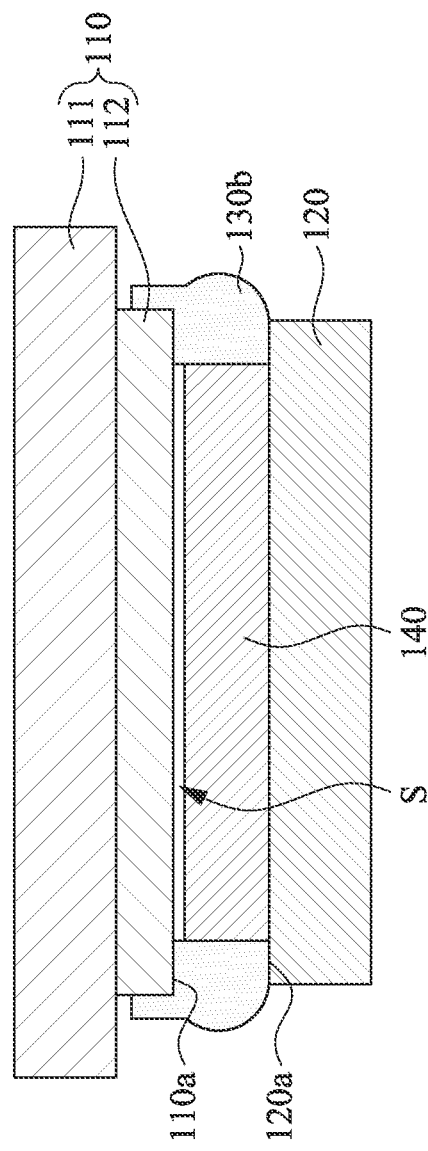
FIG. 2B is a schematic cross-sectional view illustrating an intermediate stage of manufacturing the electronic device according to an embodiment of the present disclosure.
Figure 3:
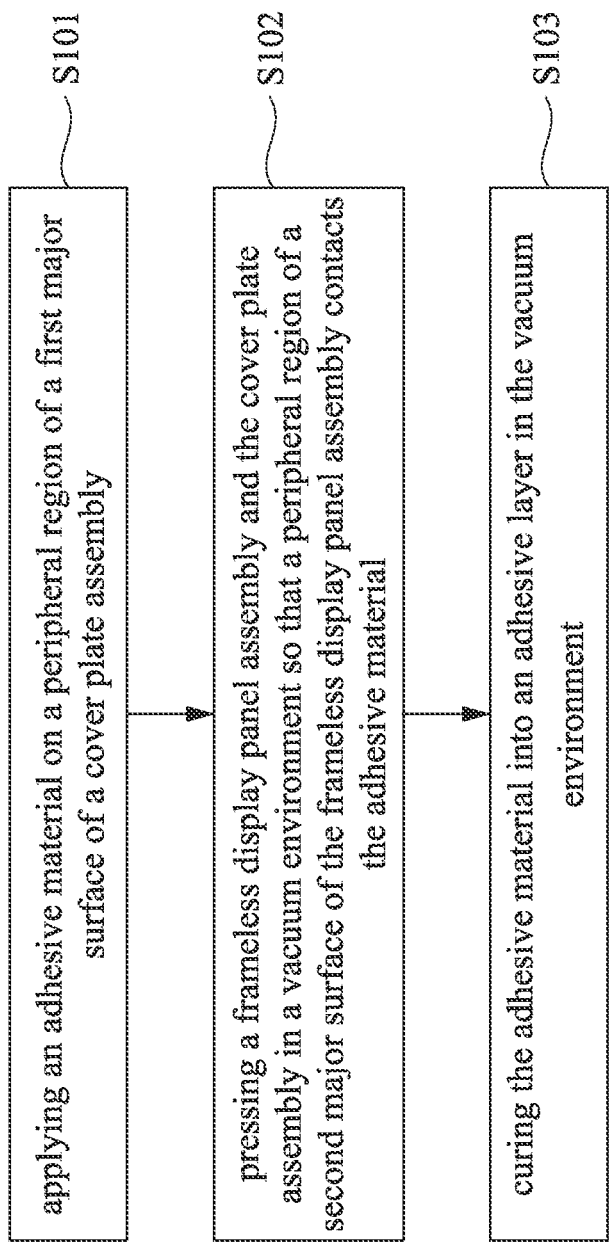
FIG. 3 is a flowchart of a method of manufacturing an electronic device according to an embodiment of the present disclosure.

Reference is made to FIGS. 2A, 2B, and 3. FIG. 2A is a schematic cross-sectional view illustrating an intermediate stage of manufacturing the electronic device 100 according to an embodiment of the present disclosure. FIG. 2B is a schematic cross-sectional view illustrating an intermediate stage of manufacturing the electronic device 100 according to an embodiment of the present disclosure. FIG. 3 is a flowchart of a method of manufacturing an electronic device according to an embodiment of the present disclosure. As shown in FIG. 3 with reference to FIGS. 2A and 2B, in the present embodiment, the method of manufacturing an electronic device mainly includes step S101 to step S103.

Step S101: applying an adhesive material 130b on a peripheral region of a first major surface 110a of a cover plate assembly 110, in which the peripheral region of the first major surface 110a has a first area (as shown in FIG. 2A).

Step S102: pressing a frameless display panel assembly 120 and the cover plate assembly 110 in a vacuum environment so that a peripheral region of a second major surface 120a of the frameless display panel assembly 120 contacts the adhesive material 130b, in which the peripheral region of the second major surface 120a has a second area smaller than the first area (as shown in FIG. 2B).

Step S103: curing the adhesive material 130b into an adhesive layer 130a in the vacuum environment, in which the adhesive layer 130a is a frame-shaped and elastic colloid, the adhesive layer 130a, the cover plate assembly 110, and the frameless display panel assembly 120 together form a closed space S, and the closed space S has a spacing G smaller than 200 microns (as shown in FIG. 1).

In some embodiments, the adhesive material 130b includes RTV (Room Temperature Vulcanization Compound) silicone, which is a room temperature curing material (e.g., a material that cures at 20° C.-25° C.). The main component of the adhesive material 130b is silicon, the average temperature resistance thereof is between −50° C. and 200° C., and the adhesive material 130b has good weather resistance, good insulation, is not easy to age, and waterproof.

Figure 4:
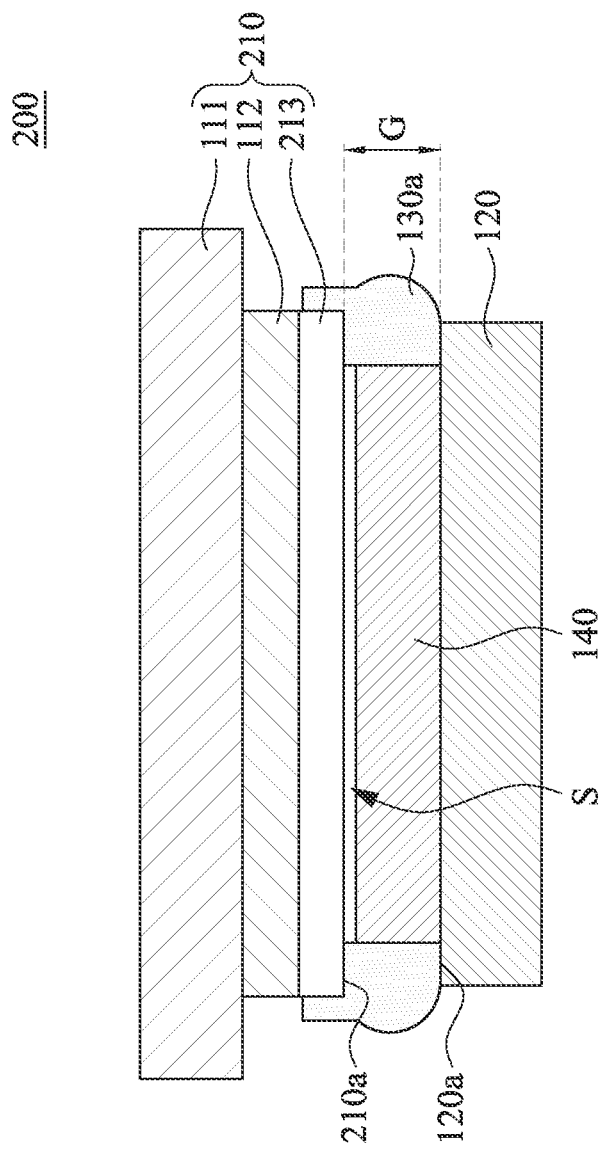
FIG. 4 is a schematic cross-sectional view of an electronic device according to another embodiment of the present disclosure.

Reference is made to FIG. 4. FIG. 4 is a schematic cross-sectional view of an electronic device 200 according to another embodiment of the present disclosure. As shown in FIG. 4, in the present embodiment, the electronic device 200 includes a cover plate assembly 210, a frameless display panel assembly 120, and an adhesive layer 130a. The frameless display panel assembly 120 and the adhesive layer 130a are the same as the embodiment shown in FIG. 1, so the related descriptions of these components can be referenced above and will not be repeated here. It should be noted that, compared with the embodiment shown in FIG. 1, the cover plate assembly 210 of the present embodiment further includes an anti-glare layer 213. The anti-glare layer 213 is disposed on a side of the touch panel 112 away from the cover plate body 111 and forms at least a part of a first major surface 210a. The adhesive layer 130a is disposed between the peripheral region of the first major surface 210a and a peripheral region of the second major surface 120a. The adhesive layer 130a, the cover plate assembly 210, and the frameless display panel assembly 120 together form a closed space S after being pressed together, and the closed space S has a spacing G smaller than 200 microns.

With the foregoing structural configurations, the spacing G of the closed space S formed by the adhesive layer 130a, the cover plate assembly 210, and the frameless display panel assembly 120 can also be effectively controlled, and the deformation problem and the Mura problem caused by deformation in large-scale applications can be effectively suppressed.

In some embodiments, a haze of the anti-glare layer 213 is at least greater than 15%, so as to effectively avoid the problem of uneven brightness caused by the Mura phenomenon (if any) of the frameless display panel assembly 120.

According to the foregoing recitations of the embodiments of the disclosure, it can be seen that in the electronic device of the present disclosure, the cover plate assembly and the frameless display panel assembly are laminated together by using the elastic frame-shaped adhesive layer, and the spacing of the closed space formed by the adhesive layer, the cover plate assembly, and the frameless display panel assembly is limited to be smaller than 200 microns, such that the spacing can be effectively controlled.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising:
   a cover plate assembly having a first major surface, a peripheral region of the first major surface having a first area;
   a frameless display panel assembly disposed below the cover plate assembly and having a second major surface, a peripheral region of the second major surface having a second area smaller than the first area; and
   an adhesive layer disposed between the peripheral region of the first major surface and the peripheral region of the second major surface, wherein the adhesive layer is a frame-shaped and elastic colloid, the adhesive layer, the cover plate assembly, and the frameless display panel assembly together form a closed space after being pressed together, the closed space is vacuumed, and the closed space has a spacing smaller than 200 microns.

2. The electronic device of claim 1, wherein an air pressure value in the closed space is between 0.0003 MPa and 0.001 MPa.

3. The electronic device of claim 1, wherein the cover plate assembly comprises:
   a cover plate body; and
   a touch panel stacked below the cover plate body and located between the cover plate body and the frameless display panel assembly.

4. The electronic device of claim 3, wherein the touch panel comprises a silver nanowire electrode layer, and the touch panel formed by the silver nanowire electrode layer defines at least a part of the first major surface.

5. The electronic device of claim 3, wherein the cover plate assembly further comprises an anti-glare layer, and the anti-glare layer is disposed on a side of the touch panel away from the cover plate body and forms at least a part of the first major surface.

6. The electronic device of claim 5, wherein a haze of the anti-glare layer is at least greater than 15%.

7. The electronic device of claim 1, further comprising an optical film layer disposed on the second major surface.

8. The electronic device of claim 7, wherein a haze of the optical film layer is at least greater than 15%.

9. A method of manufacturing an electronic device, comprising:
   applying an adhesive material on a peripheral region of a first major surface of a cover plate assembly, wherein the peripheral region of the first major surface has a first area;
   pressing a frameless display panel assembly and the cover plate assembly so that a peripheral region of a second major surface of the frameless display panel assembly contacts the adhesive material, wherein the peripheral region of the second major surface has a second area smaller than the first area; and
   curing the adhesive material into an adhesive layer, wherein the adhesive layer is a frame-shaped and elastic colloid, the adhesive layer, the cover plate assembly, and the frameless display panel assembly together form a closed space, and the closed space has a spacing smaller than 200 microns,
   wherein the pressing the frameless display panel assembly and the cover plate assembly and the curing the adhesive material into the adhesive layer are performed in a vacuum environment.

10. The method of claim 9, wherein an air pressure value in the closed space is between 0.0003 MPa and 0.001 MPa.

11. The method of claim 9, wherein the cover plate assembly comprises a cover plate body and a touch panel stacked on each other, the touch panel comprises a silver nanowire electrode layer, and the touch panel formed by the silver nanowire electrode layer defines at least a part of the first major surface.

12. An electronic device, comprising:
 a cover plate assembly having a first major surface, a peripheral region of the first major surface having a first area;
 a frameless display panel assembly disposed below the cover plate assembly and having a second major surface, a peripheral region of the second major surface having a second area smaller than the first area;
 an adhesive layer disposed between the peripheral region of the first major surface and the peripheral region of the second major surface, wherein the adhesive layer is a frame-shaped and elastic colloid, the adhesive layer, the cover plate assembly, and the frameless display panel assembly together form a closed space after being pressed together, and the closed space has a spacing smaller than 200 microns; and
 an optical film layer disposed on the second major surface.

13. The electronic device of claim 12, wherein a haze of the optical film layer is at least greater than 15%.

14. The electronic device of claim 12, wherein the cover plate assembly comprises:
 a cover plate body; and
 a touch panel stacked below the cover plate body and located between the cover plate body and the frameless display panel assembly.

15. The electronic device of claim 14, wherein the touch panel comprises a silver nanowire electrode layer, and the touch panel formed by the silver nanowire electrode layer defines at least a part of the first major surface.

16. The electronic device of claim 14, wherein the cover plate assembly further comprises an anti-glare layer, and the anti-glare layer is disposed on a side of the touch panel away from the cover plate body and forms at least a part of the first major surface.

17. The electronic device of claim 16, wherein a haze of the anti-glare layer is at least greater than 15%.

\* \* \* \* \*